United States Patent
Goga et al.

(10) Patent No.: US 6,832,896 B1
(45) Date of Patent: Dec. 21, 2004

(54) BLADE PLATFORMS FOR A ROTOR ASSEMBLY

(75) Inventors: Jean-Luc Goga, Champagne sur Seine (FR); Pierre Lamothe, Saint Paul sur Save (FR)

(73) Assignee: Snecma Moteurs, Paris (FR)

( * ) Notice: Subject to any disclaimer, the term of this patent is extended or adjusted under 35 U.S.C. 154(b) by 73 days.

(21) Appl. No.: 10/277,810

(22) Filed: Oct. 23, 2002

(30) Foreign Application Priority Data

Oct. 24, 2001 (FR) .......................................... 01 13714

(51) Int. Cl.⁷ ................................................ F01D 5/22
(52) U.S. Cl. ................ 416/191; 416/193 R; 416/194 A
(58) Field of Search ........................... 416/193 A, 191, 416/193 R, 196 R, 248, 219 R, 220 R, 221

(56) References Cited

U.S. PATENT DOCUMENTS

| 3,119,595 A | | 1/1964 | Wilson, III et al. | |
| 3,640,640 A | * | 2/1972 | Palfreyman et al. | .... 416/220 R |
| 5,791,877 A | | 8/1998 | Stenneler | |
| 6,290,466 B1 | * | 9/2001 | Ravenhall et al. | ...... 416/220 R |
| 6,398,499 B1 | | 6/2002 | Simonetti et al. | |
| 6,431,835 B1 | * | 8/2002 | Kolodziej et al. | .......... 416/248 |

FOREIGN PATENT DOCUMENTS

| EP | 0 495 586 A1 | | 7/1992 | |
| EP | 1 085 172 A2 | | 3/2001 | |
| FR | 2 739 136 | | 3/1997 | |
| GB | 836030 A | * | 6/1960 | ................. 416/248 |

* cited by examiner

Primary Examiner—Christopher Verdier
(74) Attorney, Agent, or Firm—Oblon, Spivak, McClelland, Maier & Neustadt, P.C.

(57) ABSTRACT

A rotary assembly comprising a disk having recesses at its periphery; a plurality of blades carried by the disk, each blade having a blade root engaged in a corresponding recess of the disk, and a plurality of fitted platforms each mounted on the disk between two adjacent blades, each platform being a piece of sheet metal of substantially omega section having two flanks interconnected by a web and shaped so as to press against the side walls of the bottom portions of two adjacent blades, with the end portions of the flanks presenting respective setbacks which fit closely to the outlines of one side of a blade root and of the adjacent side of the wall of a recess in which the blade root is received.

20 Claims, 2 Drawing Sheets

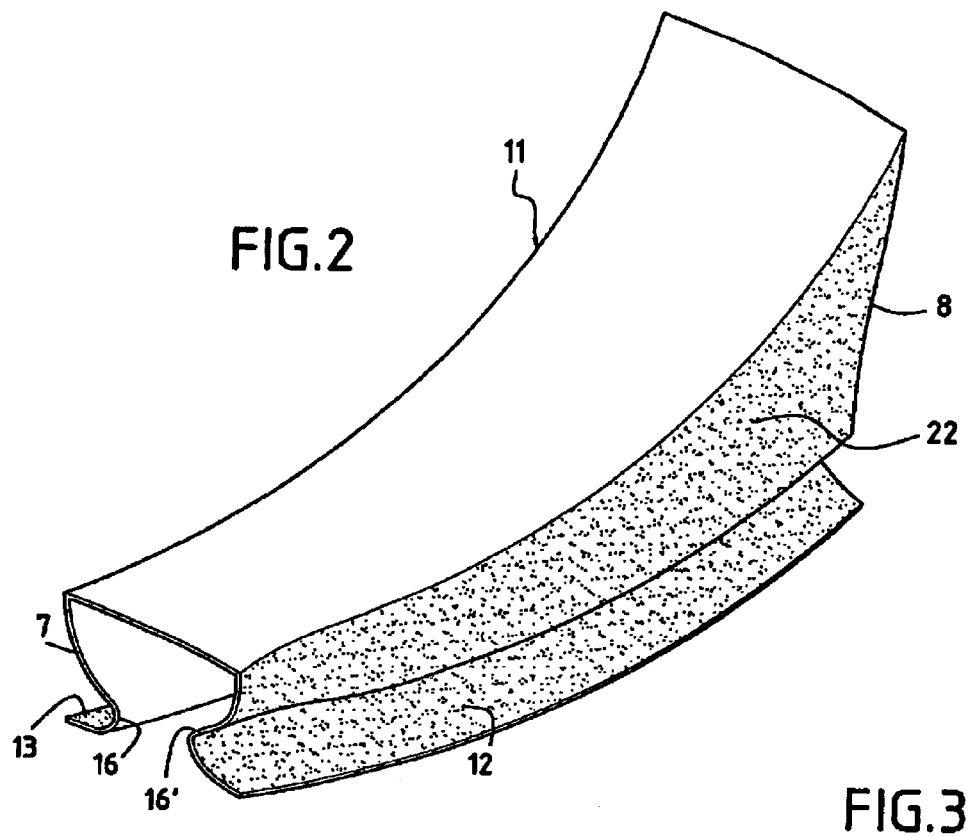
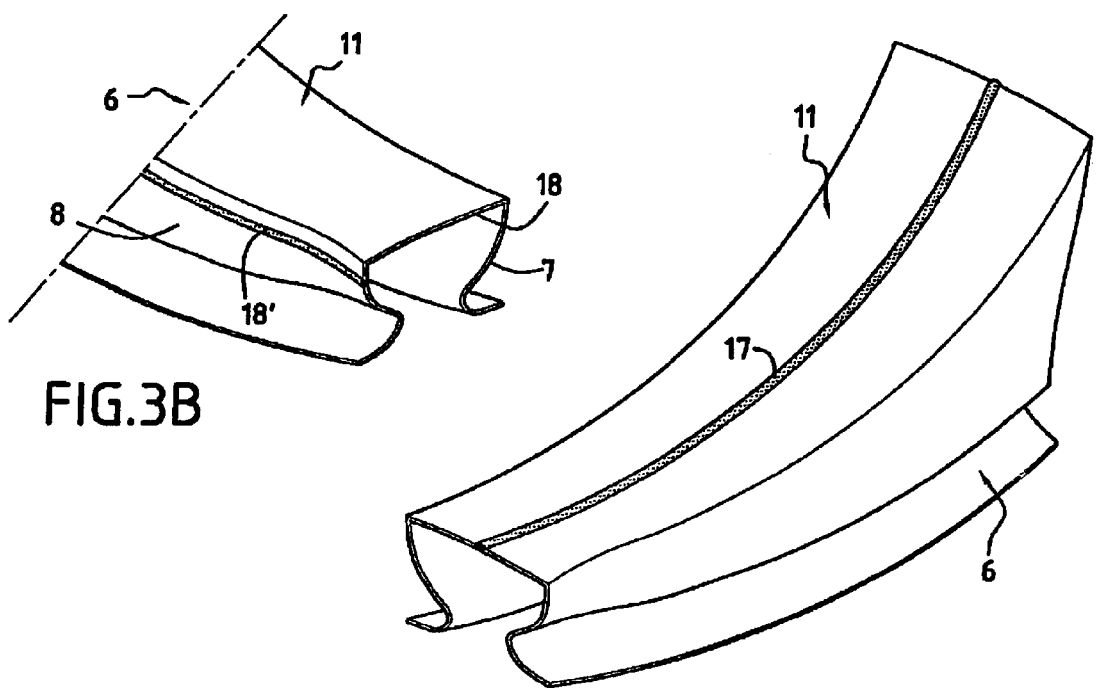

BLADE PLATFORMS FOR A ROTOR ASSEMBLY

BACKGROUND OF THE INVENTION

The present invention relates to a rotor assembly for an airplane gas turbine engine. More particularly, it relates to blade platforms for the fan portion of such an engine, but it is equally applicable to platforms for mounting blades in other rotary assemblies, e.g. in the compressor.

In known manner, the fan of a gas turbine engine comprises a disk having angularly spaced-apart blades received so as to be pivotable to a small extent. Each blade is connected to the two blades adjacent thereto via force transmitter members (also referred to as platforms) which serve under normal circumstances to limit pivoting of the blades. These platforms also serve to protect the disk and the blades of the fan, which parts are expensive.

At present, there are two types of blade platforms for gas turbine engine fans and they are made using the following technologies:

platforms that are directly integrated with the blades for straight fastenings; and platforms fitted between the blades.

By way of example, for platforms fitted between the blades, one known system consists in holding the platform, e.g. made of aluminum, by means of pegs which are fixed on flanges of the fan disk and to a cheek plate provided at the front of the disk. The assembly is sealed by lateral gaskets of rubber which are pressed and deformed against the blades by the centrifugal force that results from the fan disk rotating.

That platform-holding system presents a major problem associated with the platform balancing to be performed by the pegs, and with controlling displacements between the pegs and the platform.

Furthermore, the problems encountered in operation are numerous, and in particular the following:

the sealing gaskets lift off;

the bushings of the holding pegs move in translation, in spite of being clamped when the platform is assembled;

the pegs become loose relative to the flanges; and there is a risk of corrosion.

In addition, problems of wear are observed on the bearing surfaces of the blades and of the disk of the fan. In order to resolve those problems, and more particularly the problem relating to bearing surface wear, it is also known to re-machine the recess of the disk in which the blade root is mounted, and to insert a piece of metal that acts as shim (also referred to as "tinsel").

Nevertheless, in spite of the presence of the shim, it is still found that the deposit of varnish type antiwear material lifts off from the bearing surfaces of the blades and of the fan disk. Furthermore, reboring is an operation that is difficult and time consuming.

OBJECT AND SUMMARY OF THE INVENTION

The present invention seeks to propose a platform fitted to blades and a rotary assembly using such a platform while avoiding the above drawbacks.

To this end, the invention provides a rotary assembly comprising a disk having recesses at its periphery, a plurality of blades carried by the disk, each blade having a blade root engaged in a corresponding recess of the disk, and a plurality of fitted platforms each mounted on the disk between two adjacent blades, wherein each platform is a piece of sheet metal of substantially omega section having two flanks interconnected by a web and shaped so as to press against the side walls of the bottom portions of two adjacent blades, with the end portions of the flanks presenting respective setbacks which fit closely to the outlines of one side of a blade root and of the adjacent side of the wall of a recess in which the blade root is received.

This particular platform shape makes it possible both to protect the blades and the disks, and also to provide sealing for the assembly.

BRIEF DESCRIPTION OF THE DRAWINGS

Other characteristics and advantages of the present invention appear from the following description made with reference to the accompanying drawings which show an embodiment having no limiting character. In the figures:

FIG. 2 is a perspective view of a platform constituting a first embodiment of the invention; and FIGS. 3A and 3B are perspective views respectively of a second and of a third embodiment of a platform of the invention.

DETAILED DESCRIPTION OF AN EMBODIMENT

Figure 1:
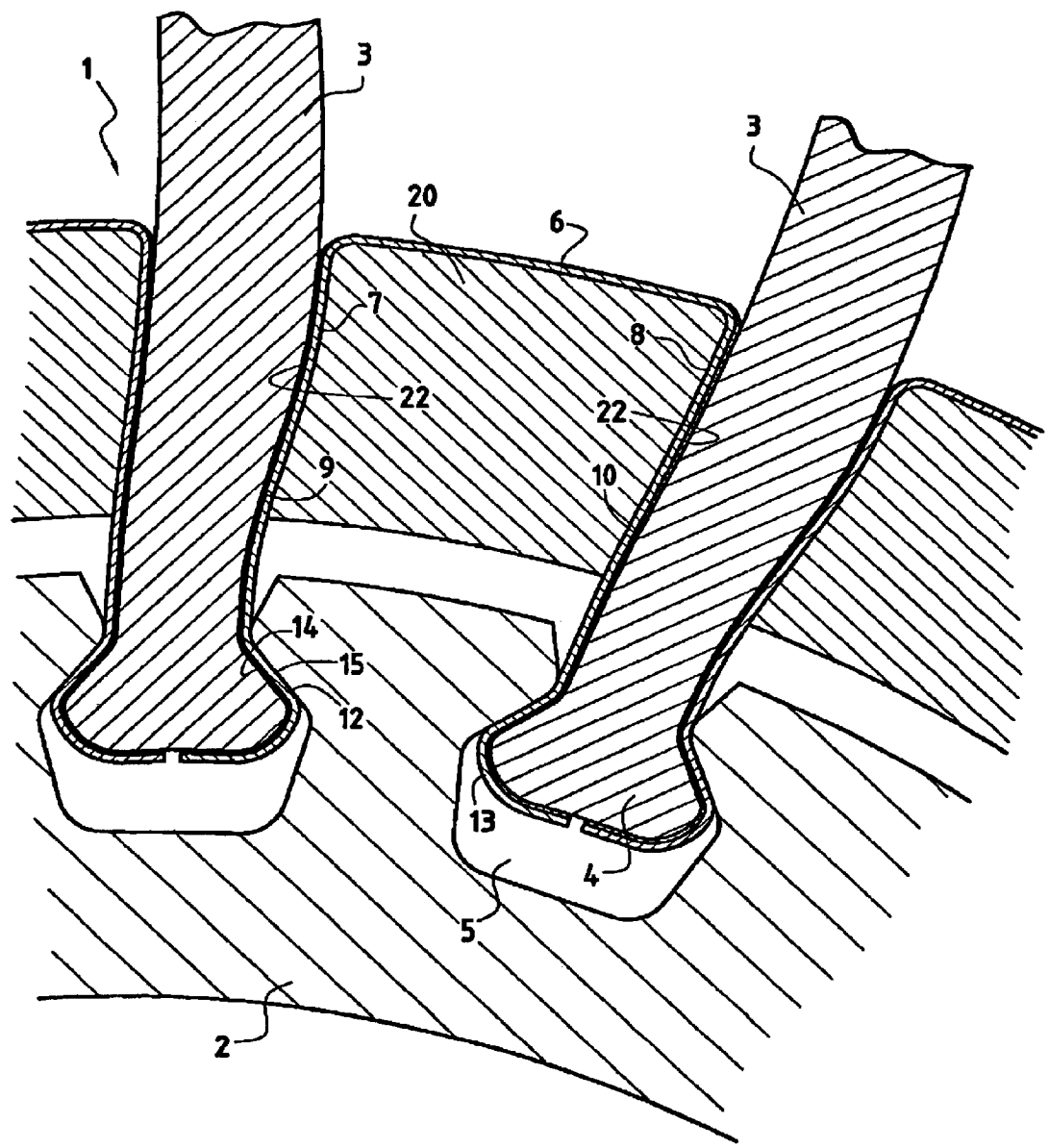
FIG. 1 is a diagrammatic and fragmentary view of a platform of the invention mounted on a fan disk of a gas turbine engine.

In FIG. 1, reference 1 designates a rotary assembly of a gas turbine engine, which assembly includes a disk 2. The rotary assembly can be an engine fan, for example. The disk of the rotary assembly is conventionally provided with a plurality of moving blades 3 of aerodynamic profile which are regularly spaced apart from one another around its entire periphery.

Each blade 3 has a dovetail-shaped root 4 which is mounted in a recess 5 provided for this purpose in the disk 2 of the rotary assembly 1. These recesses 5 are likewise dovetail-shaped, and of dimensions that are slightly greater than those of a blade root 4. The roots are thus mounted in the recesses with a certain amount of play.

Furthermore, each blade 3 is connected near its root 4 to each of the two blades that are adjacent thereto by means of respective fitted platforms 6. A platform 6 thus serves to protect the blades and the disks and to reconstitute an aerodynamic section between the blades.

For this purpose, the platform 6 is shaped so as to be received between two adjacent blades as shown in FIG. 1. In FIG. 2, it can be seen more precisely that the platform 6 is a piece of sheet metal of generally omega ($\Omega$) shape having two flanks 7 and 8 interconnected by a web 11. The flanks are shaped so as to press against the side walls 9 and 10 of the bottom portions of two adjacent blades between which the platform is inserted.

Furthermore, on its side remote from the web 11, each flank 7, 8 is terminated by an end portion 12, 13 that becomes engaged between one side 14 of a blade root 4 and the adjacent side 15 of the wall of a recess 5 in which the blade root is received. More precisely, the end portions 12, 13 of the platform flanks present setbacks 16, 16' or concave portions which fit closely to the outlines of a blade root side 14 and the corresponding side of its housing in the disk 2.

By means of this particular shape, and because the root 4 of each blade 3 is well received in the corresponding recess 5, it is easy to control the radial position of the platform. The centrifugal force that results from rotation of the disk causes the flanks 7 and 8 of the platform 6 to tend to become pressed against the side walls 9 and 10 of the bottom portions of the two blades between which the platform is engaged, thereby providing good sealing for the assembly at the periphery of the disk. There is therefore no need to use sealing gaskets.

Naturally, the flanks 7 and 8 of the platform 6 are of sufficient height between the root and the tip of the blade to ensure that they are not subject to excessive deformation as could result from the effects of centrifugal force. In addition, the platform is made of a material which is elastically deformable so as to ensure that it does not break under the effect of centrifugal force. For example, it could be made out of aluminum or out of any other similar material.

The platform 6 preferably includes a stiffener 20 level with its web. The stiffener serves to avoid excessive deformation under the effect of centrifugal force. It is in the form of folded or welded sheet metal extending radially from one end of the platform.

The flanks 7 and 8 of the platform 6 are advantageously coated in an antiwear material 22 of the varnish type, at least on those faces that come into contact with the bottom portions of the side walls 9 and 10 of the blades 3 and with the walls of the recesses 5 in the disk 2.

The present invention also provides a blade platform 6 for a gas turbine engine fan as described above.

Three different embodiments of a platform 6 of the present invention are described briefly below.

In a first embodiment (FIG. 2), the platform 6 is made by folding a single piece of aluminum or similar sheet material.

In a second embodiment (FIG. 3A), the platform 6 is made by folding and welding together two sheet metal portions made of aluminum or similar metal, the join being along a generator line 17 in the middle of the web 11 of the platform.

Finally, in a third embodiment (FIG. 3B), the platform is made by folding and welding together three pieces of aluminum or similar sheet metal along respective generator lines 18 and 18' of the flanks 7 and 8 of the platform.

As described above, the present invention provides multiple advantages, and in particular it serves to mitigate the problems encountered with the platforms in conventional use. In particular, the specific shape of the platform of the present invention provides protection both to the blades and to the disks carrying them, and also serves to seal the assembly.

What is claimed is:

1. A rotary assembly comprising a disk having recesses at its periphery, a plurality of blades carried by the disk, each blade having a blade root engaged in a corresponding recess of the disk, and a plurality of fitted platforms each mounted on the disk between two adjacent blades, wherein each platform is a piece of sheet metal of substantially omega section having two flanks interconnected by a web and shaped so as to press against the side walls of the bottom portions of two adjacent blades, with the end portions of the flanks presenting respective setbacks which fit closely to the outlines of one side of a blade root and of the adjacent side of the wall of a recess in which the blade root is received.

2. An assembly according to claim 1, wherein the web of each platform includes a stiffener.

3. An assembly according to claim 1, wherein the flanks of each platform are coated in an antiwear material.

4. An assembly according to claim 1, wherein each platform is made from a single piece of folded sheet metal.

5. An assembly according to claim 1, wherein each platform is made by folding two pieces of sheet metal and welding them together along a generator line extending along the middle of the web of the platform.

6. An assembly according to claim 1, wherein each platform is made by folding three pieces of sheet metal and welding them together along respective generator lines of each of the flanks of the platform.

7. A platform for mounting blades in recesses of a disk, the platform being constituted by a piece of sheet metal of substantially omega section having two flanks interconnected by a web and shaped so as to press against the side walls of the bottom portions of two adjacent blades, the end portions of the flanks presenting setbacks so that each of the setbacks engages between one side of a blade root and the adjacent side of the wall of a recess in which the blade root is received.

8. A platform according to claim 7, wherein its web includes a stiffener.

9. A platform according to claim 7, wherein the flanks are coated in an antiwear material.

10. A platform according to claim 7, the platform being made from folded sheet metal.

11. A platform according to claim 1, wherein, said setbacks are concave portions.

12. A platform according to claim 7, wherein said setbacks are concave portions.

13. A platform according to claim 1, wherein, for each platform, said end portions of said two flanks diverge inwardly from each other.

14. A platform according to claim 7, wherein said end portions of said two flanks diverge inwardly from each other.

15. A platform according to claim 1, wherein said two flanks have a length so that said web between said two flanks does not contact said disk.

16. A platform according to claim 7, wherein said two flanks have a length so that said web between said two flanks does not contact said disk.

17. A platform according to claim 1, wherein each of said end portions of said flanks covers a portion of a bottom surface of said blade root.

18. A platform according to claim 7, wherein each of said end portions of said flanks covers a portion of a bottom surface of said blade root.

19. A platform according to claim 1, wherein said two flanks provide a seal between the disk and the blades.

20. A platform according to claim 7, wherein said two flanks provide a seal between the disk and the blades.

* * * * *